United States Patent
Fitzek et al.

(10) Patent No.: US 7,209,460 B2
(45) Date of Patent: Apr. 24, 2007

(54) APPARATUS AND METHOD FOR ASSIGNING SUBCARRIER IN OFDMA COMMUNICATION SYSTEM

(75) Inventors: Frank Hanns Paul Fitzek, Aalborg (DK); Carl Simon Wijting, Aalborg (DK); Jeroen Theeuwes, Aalborg (DK); Petar Popovski, Aalborg (DK); Ramjee Prasad, Aalborg (DK); Chang-Ho Suh, Yongin-si (KR); Seok-Hyun Yoon, Seoul (KR); Sung-Kwon Hong, Seoul (KR); Young-Kwon Cho, Suwon-si (KR); Young-Kyun Kim, Seongnam-si (KR); Dong-Seek Park, Yongin-si (KR); Jung-Min Ro, Seoul (KR)

(73) Assignee: Samsung Electronics Co., Ltd. (KR)

( * ) Notice: Subject to any disclaimer, the term of this patent is extended or adjusted under 35 U.S.C. 154(b) by 32 days.

(21) Appl. No.: 11/214,312

(22) Filed: Aug. 29, 2005

(65) Prior Publication Data

US 2006/0079240 A1    Apr. 13, 2006

(30) Foreign Application Priority Data

Aug. 28, 2004    (KR)    ............... 10-2004-0068282

(51) Int. Cl.
 *H04Q 7/20*    (2006.01)
 *H04Q 7/38*    (2006.01)

(52) U.S. Cl. ............... 370/329; 370/328; 370/208; 370/340; 370/341; 370/203; 370/430; 455/450; 455/452.1; 455/452.2; 455/509; 455/511; 455/515; 375/220

(58) Field of Classification Search ............. 370/329, 370/328, 208, 340, 341, 203, 430; 455/450, 455/451, 452.1, 452.2, 509, 511, 515, 69, 455/68, 422.1, 403, 445, 500, 517, 426.1, 455/414.1, 414.2, 414.3
See application file for complete search history.

(56) References Cited

U.S. PATENT DOCUMENTS

| | | | |
|---|---|---|---|
| 6,377,636 B1 * | 4/2002 | Paulraj et al. | ............ 375/346 |
| 7,072,315 B1 * | 7/2006 | Liu et al. | ................ 370/329 |
| 2004/0120289 A1 * | 6/2004 | Hamalainen et al. | ....... 370/335 |

* cited by examiner

Primary Examiner—Keith Ferguson
(74) Attorney, Agent, or Firm—The Farrell Law Firm (57) ABSTRACT

A subcarrier assignment apparatus and a subcarrier assignment method, in which each of a plurality of Base Stations (BSs) constituting an Orthogonal Frequency Division Multiple Access (OFDMA) communication system provides services in the capacity of a serving BS to Mobile Stations (MSs). Channel quality information for the respective MSs are fed-back from the respective BSs. Subcarriers are assigned to the respective MSs according to a corresponding scheduling scheme in consideration of the channel quality information for the respective MSs, which are fed-back from the respective BSs, and then BSs which manage the subcarriers assigned to the respective MSs according to the corresponding scheduling scheme are selected. These operations provide site diversity to each of the MSs, and thus system capacity is maximized.

18 Claims, 8 Drawing Sheets

APPARATUS AND METHOD FOR ASSIGNING SUBCARRIER IN OFDMA COMMUNICATION SYSTEM

PRIORITY

This application claims priority to an application entitled "Apparatus and Method for Assigning Subcarrier in OFDMA Communication System" filed in the Korean Industrial Property Office on Aug. 28, 2004 and assigned Serial No. 2004-68282, the contents of which are incorporated herein by reference.

BACKGROUND OF THE INVENTION

1. Field of the Invention

The present invention relates to a communication system employing an Orthogonal Frequency Division Multiple Access (OFDMA) scheme, and more particularly to a subcarrier assignment apparatus and a subcarrier assignment method for site diversity in an OFDMA communication system.

2. Description of the Related Art

Considerable research has been pursued toward a $4^{th}$ generation (4G) communication system, a next generation communication system, for providing users with services which have various Qualities of Service (QoS). In particular, research is being vigorously pursued to support high-speed services which ensure mobility and QoSs for a broadband wireless communication system such as a Wireless Local Area Network (WLAN) communication system and a Wireless Metropolitan Area Network (WMAN) communication system.

In the 4G communication system, public attention is attracted to an OFDM scheme which is useful for high-speed data transmission over a wired/wireless channel. The OFDM scheme is a data transmission scheme using a multi-carrier and is also a kind of a Multi-Carrier Modulation (MCM) scheme in which symbol strings inputted in series are converted into parallel symbol strings, and the respective parallel symbol strings are modulated with a plurality of subcarriers having mutual orthogonality and then transmitted.

Wideband spectrum resources are required for providing high-speed and high-quality wireless multimedia services by the 4G communication system. However, when the wideband spectrum resources are used, the fading phenomenon on a wireless transmission path becomes serious due to multipath propagation, and a frequency-selective fading phenomenon, which may also occur even in a transmission band. Thus, in implementing the high-speed wireless multimedia services, an OFDM scheme having very strong resistance to the frequency-selective fading phenomenon gains an advantage over a conventional Code Division Multiple Access (CDMA) scheme. Thus, there is a strong tendency to utilize the OFDM scheme in the 4G communication system.

In general, a wireless communication system is a cellular communication system consisting of a plurality of cells, in which a Base Station (BS) may control the plurality of cells and a Mobile Station (MS) is connected to the BS to communicate therewith. Also, a BS in communication with the MS, (i.e., a BS providing services to the MS) is a serving BS, and the serving BS manages various resources for supporting the MS's communications. As a result, the serving BS is a BS which supports all operations for performing communications with the MS until the MS handovers to any BS other than the serving BS, such as any neighbor BS (i.e., target BS). The MS has only one serving BS.

In such a cellular configuration, different characteristics are exhibited according to whether the characteristics corresponds to those of a cell center region or those of a cell boundary region as will be described below:

(1) in regard to delay spread, the cell center region has comparatively small delay spread, but the cell boundary region has comparatively large delay spread.

(2) with respect to frequency selective fading, the cell center region is stable without substantial influence of the frequency selective fading, but the cell boundary region is seriously influenced by the frequency selective fading; and (3) in view of Inter Cell Interference (ICI) variation, the cell center region has almost no ICI variation and thus is stable, but the cell boundary region shows significant ICI variation.

The 4G communication system aims at providing high-speed and high-quality services, so it must be able to provide the high-speed and high-quality services to the MS operating in the cell center region, as well as the MS operating in the cell boundary region in the same way. However, since the channel qualities of the cell boundary region are generally inferior to those of the cell center region as stated above, there is an important objective to compensate for the deterioration in channel quality of the cell boundary region.

SUMMARY OF THE INVENTION

Accordingly, the present invention has been made to solve at least the above-mentioned problems occurring in the prior art, and an object of the present invention is to provide a subcarrier assignment apparatus and a subcarrier assignment method for site diversity in an OFDMA communication system having a multi serving BS structure.

A further object of the present invention is to provide a subcarrier assignment apparatus and a subcarrier assignment method in an OFDMA communication system having a multi serving BS structure, which can maximize system capacity.

A still further object of the present invention is to provide a subcarrier assignment apparatus and a subcarrier assignment method in an OFDMA communication system having a multi serving BS structure, which can minimize system complexity.

In order to accomplish these objects, in accordance with one aspect of the present invention, there is provided a apparatus for assigning subcarrier in an OFDMA communication system, the apparatus including schedulers for assigning subcarriers to each of MSs, to which each of a plurality of BSs constituting the OFDMA communication system provides services in the capacity of a serving BS, according to a corresponding scheduling scheme in consideration of channel quality information for the respective MSs, which are fed-back from the respective BSs, and selecting BSs which manage the subcarriers assigned to the respective MSs according to the corresponding scheduling scheme.

In order to accomplish the above-mentioned objects, in accordance with another aspect of the present invention, there is provided a method for assigning subcarrier in an OFDMA communication system, the method including receiving from the respective base stations feedback of channel quality information for each of MSs, to which each of a plurality of BSs constituting the OFDMA communication system provides services in the capacity of a serving BS; assigning subcarriers to the respective MSs according to a corresponding scheduling scheme in consideration of the channel quality information for the respective MSs; and selecting BSs which manage the subcarriers assigned to the respective MSs according to the corresponding scheduling scheme.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention proposes a subcarrier assignment apparatus and a subcarrier assignment method for site diversity in an Orthogonal Frequency Division Multiple Access (OFDMA) communication system. In particular, the present invention newly proposes an OFDMA communication system having a multi serving Base Station (BS) structure (multi serving BS structure-OFDMA communication system), in which a plurality of serving BSs performing communications with Mobile Stations (MSs) (i.e., providing services to the MSs) exist, and the plurality of BSs transmit subcarriers assigned correspondingly to channel qualities of the MSs, thereby controlling the MSs such that they have the site diversity gain. The multi serving BS structure and the site diversity will be described later, so they are not discussed here in detail.

Also, the present invention proposes various scheduling schemes for maximizing system performance while minimizing system complexity in assigning the subcarriers in the multi serving BS structure-OFDMA communication system. Such scheduling schemes are divided into a Static Assignment/Static Reception (SA/SR) scheme, a Dynamic Assignment/Static Reception (DA/SR) scheme and a Dynamic Assignment/Dynamic Reception (DA/DR) scheme. The SA/SR, DA/SR and DA/DR schemes will be described later, so they are not discussed here in detail.

An internal structure of a subcarrier assignment apparatus for performing functions according to a preferred embodiment of the present invention will be described with reference to FIG. 1.

Figure 1:
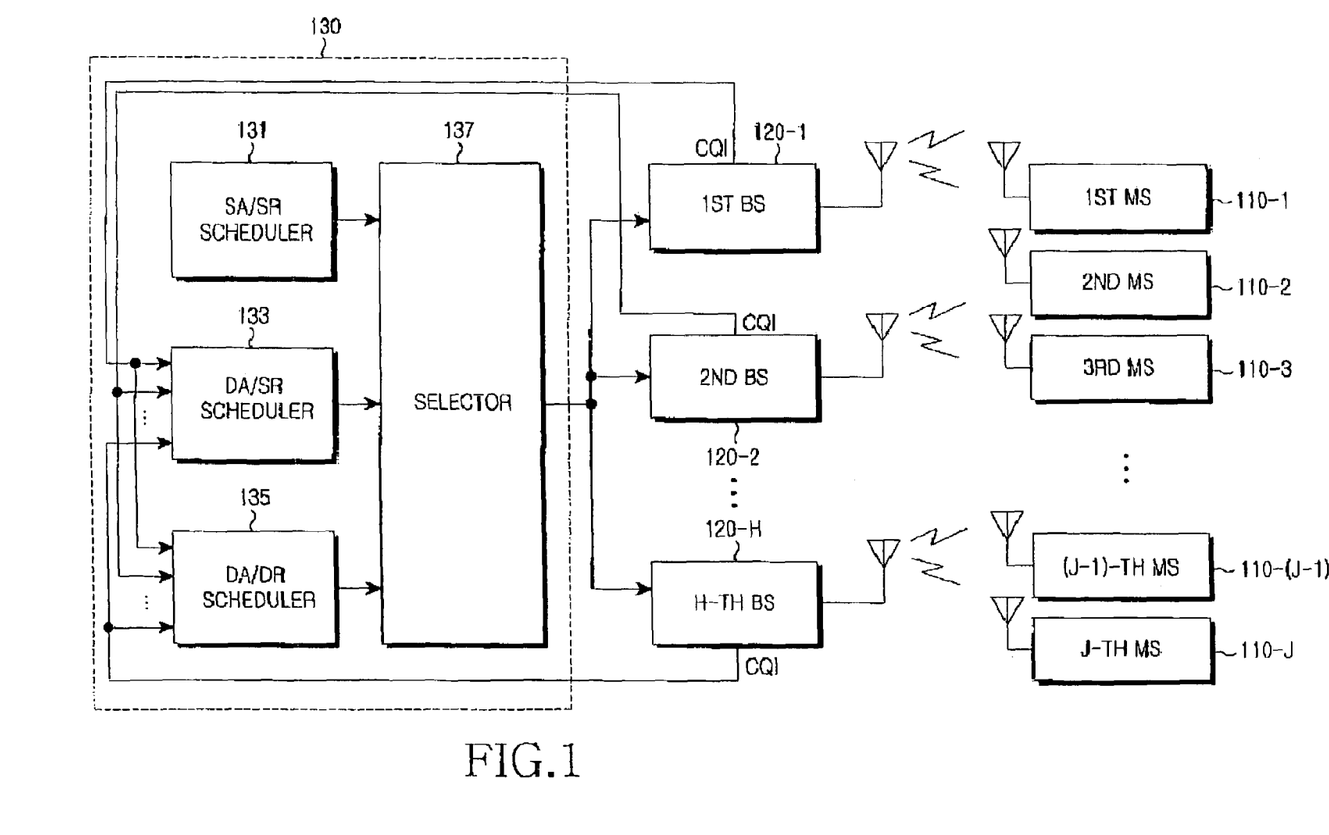
FIG. 1 is a schematic view showing an internal structure of a subcarrier assignment apparatus for performing functions according to a preferred embodiment of the present invention.

Prior to the description of FIG. 1, it is noted that a plurality of MSs, for example, J number of MSs consisting of a first MS 110-1 to a J-th MS 110-J have a plurality of serving BSs, for example, H number of BSs consisting of a first BS 120-1 to a H-th BS 120-H, respectively. Here, a serving BS for an arbitrary MS refers to a serving BS which performs communications with the arbitrary MS and provides service to the arbitrary MS. Only one serving BS exists for the arbitrary MS in a wireless communication system having a common cellular structure.

However, when the arbitrary MS exists in a region having an inferior channel quality, such as a cell boundary region, a scheme for compensating for the deterioration in channel quality is limited in a case where the arbitrary MS has only one serving BS. For this reason, the present invention proposes the multi serving BS structure-OFDMA communication system so as to make it possible to acquire the site diversity gain in the region having inferior channel quality. Consequently, in the present invention, subcarriers for performing communications of an arbitrary MS are controllably assigned to the arbitrary MS to provide the site diversity gain, thus resulting in maximization of system capacity.

Referring to FIG. 1, a subcarrier assignment apparatus 130 includes an SA/SR scheduler 131, a DA/SR scheduler 133, a DA/DR scheduler 135 and a selector 137.

Above all, each of the first MS 110-1 to the J-th MS 110-J estimates Channel Quality Information (CQI) with respect to each of the first BS 120-1 to the H-th BS 120-H by using a reference channel signal such as a pilot signals or a traffic signal, and feeds-back each of the estimated CQI to the corresponding BS. Here, detailed operations of estimating the CQI by using the pilot signal or the traffic signal are not related directly to the present invention, so a description thereof will be omitted.

Each of the first BS 120-1 to the H-th BS 120-H transmits the CQI fed-back from each of the first MS 110-1 to the J-th MS 110-J to the DA/SR scheduler 133 and the DA/DR scheduler 135. Each of the first BS 120-1 to the H-th BS 120-H is wire connected to the subcarrier assignment apparatus 130, and each of the first MS 110-1 to the J-th MS 110-J is wireless connected to each of the first BS 120-1 to the H-th BS 120-H.

The SA/SR scheduler 131 for performing scheduling in an SA/SR scheme carries out the scheduling for all the MSs to which each of the first BS 120-1 to the H-th BS 120-H provides services (i.e., for each of the first MS 110-1 to the J-th MS 110-J). Here, carrying out the scheduling signifies an operation in which subcarriers are assigned to a corresponding MS to generate information about the assigned subcarriers (MS-subcarrier-assignment-information), and the BSs, which manage the respective subcarriers assigned to the corresponding MS, are selected to generate information about the selected BSs (BS-selection-information). The SA/SR scheme will be described later with reference to FIGS. 2 and 6, so it is not discussed here in detail. As a result of carrying out the scheduling in the SA/SR scheme, the SA/SR scheduler 131 generates the MS-subcarrier-assignment-information and the BS-selection-information for each of the first MS 110-1 to the J-th MS 110-J and then transmits them to the selector 137.

The DA/SR scheduler 133 for performing scheduling in a DA/SR scheme carries out the scheduling for each of the first MS 110-1 to the J-th MS 110-J. The DA/SR scheme will be described later with reference to FIGS. 3 and 7, so it is not discussed here in detail. As a result of carrying out the scheduling in the DA/SR scheme, the DA/SR scheduler 133 generates the MS-subcarrier-assignment-information and the BS-selection-information for each of the first MS 110-1 to the J-th MS 110-J and then transmits them to the selector 137.

The DA/DR scheduler 135 for performing scheduling in a DA/DR scheme carries out the scheduling for each of the first MS 110-1 to the J-th MS 110-J. The DA/DR scheme will be described later with reference to FIGS. 4 and 8, so it is not discussed here in detail. As a result of carrying out the scheduling in the DA/DR scheme, the DA/DR scheduler 135 generates the MS-subcarrier-assignment-information and the BS-selection-information for each of the first MS 110-1 to the J-th MS 110-J and then transmits them to the selector 137.

The selector 137 selects any one set of MS-subcarrier-assignment-information and BS-selection-information from three sets of MS-subcarrier-assignment-information and BS-selection-information for each of the first MS 110-1 to the J-th MS 110-J, which are transmitted from each of the SA/SR scheduler 131, the DA/SR scheduler 133 and the DA/DR scheduler 135. Although shown separately in FIG. 1, the subcarrier assignment apparatus 130 has a transmitter which transmits one set of MS-subcarrier-assignment-information and BS-selection-information for each of the first MS 110-1 to the J-th MS 110-J to, which is selected by the selector 137, to each of the first BS 120-1 to the H-th BS 120-H.

When the selector 137 selects any one set of MS-subcarrier-assignment-information and BS-selection-information from three sets of MS-subcarrier-assignment-information and BS-selection-information for each of the first MS 110-1 to the J-th MS 110-J, which are transmitted from each of the SA/SR scheduler 131, the DA/SR scheduler 133 and the DA/DR scheduler 135, the selection is performed in accordance with a predetermined scheduling scheme for the multi serving BS structure-OFDMA communication system. That is, when the predetermined scheduling scheme is the SA/SR scheme, the selector 137 selects the MS-subcarrier-assignment-information and the BS-selection-information for each of the first MS 110-1 to the J-th MS 110-J, which are transmitted from the SA/SR scheduler 133.

Up to now, the internal structure of the subcarrier assignment apparatus for performing functions according to the preferred embodiment of the present invention has been described in conjunction with FIG. 1. An internal structure of the SA/SR scheduler 131 will be described next with reference to FIG. 2.

Figure 2:
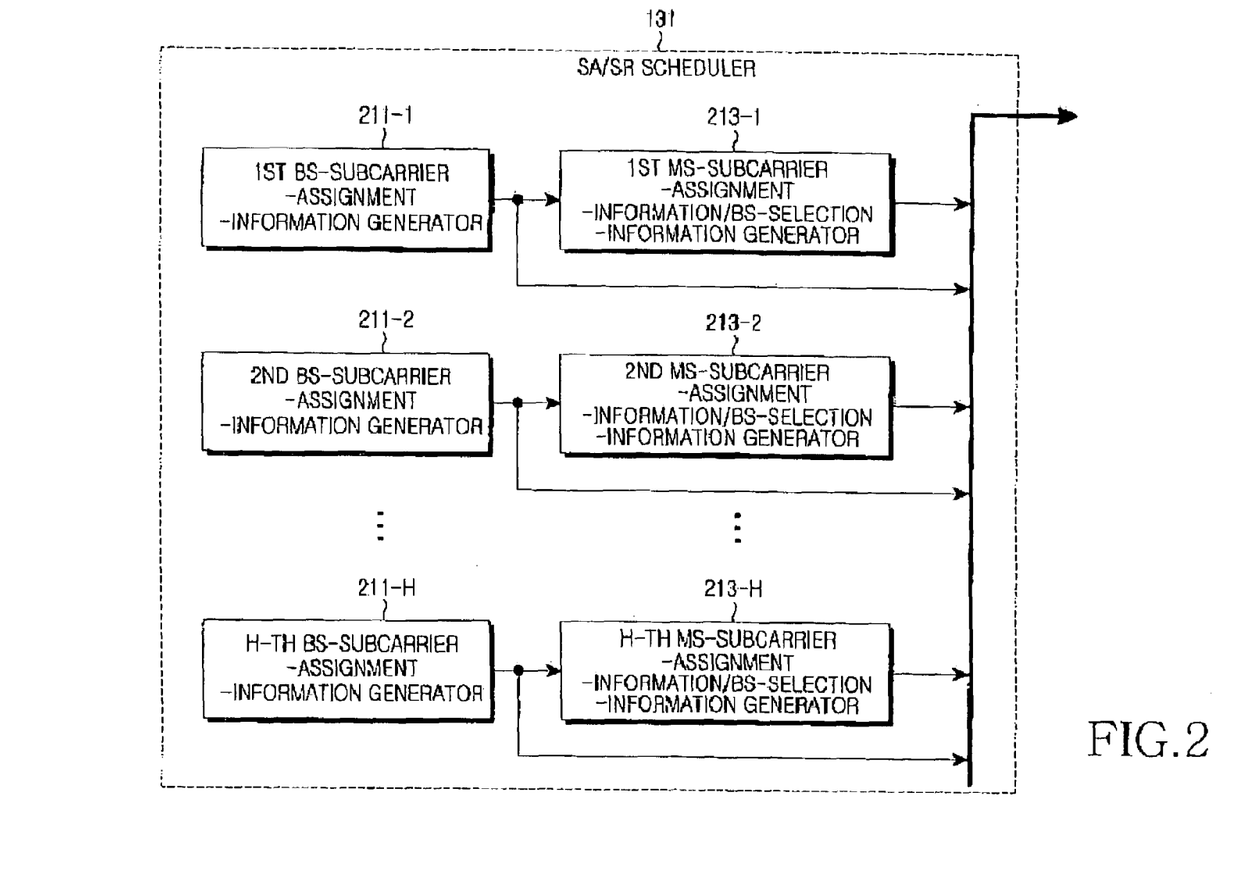
FIG. 2 is a schematic view showing an internal structure of a static assignment/static reception scheduler 131 in FIG. 1.

Referring to FIG. 2, the SA/SR scheduler 131 includes H number of BS-subcarrier-assignment-information generators consisting of a first BS-subcarrier-assignment-information generator 211-1 to a H-th BS-subcarrier-assignment-information generator 211-H, and H number of MS-subcarrier-assignment-information/BS-selection-information generators consisting of a first MS-subcarrier-assignment-information/BS-selection-information generator 213-1 to a H-th MS-subcarrier-assignment-information/BS-selection-information generator 213-H, which are connected to the first BS-subcarrier-assignment-information generator 211-1 to the H-th BS-subcarrier-assignment-information generator 211-H, respectively.

Each of the first BS-subcarrier-assignment-information generator 211-1 to the H-th BS-subcarrier-assignment-information generator 211-H generates assignment information about subcarriers assigned to itself (i.e., BS-subcarrier-assignment-information) to transmit it to a corresponding MS-subcarrier-assignment-information/BS-selection-information generator and the selector 137, respectively.

Here, the BS-subcarrier-assignment-information refers to information about subcarriers assigned to a corresponding BS from among all the subcarriers used in the multi serving BS structure-OFDMA communication system. That is, since an arbitrary MS has H number of serving BSs in the multi serving BS structure-OFDMA communication system, the whole of subcarriers used in the multi serving BS structure-OFDMA communication system are dividedly assigned to each of the H serving BSs. In other words, $b_1$ number of subcarriers are assigned to the first BS 120-1, $b_2$ number of subcarriers are assigned to the second BS 120-1, and so forth. In this way, $b_H$ number of subcarriers are finally assigned to the H-th BS 120-H.

Also, since the SA/SR scheduler 131 performs scheduling by using the SA/SR scheme, the number and positions of subcarriers assigned to the respective BSs are fixed. Here, the positions of subcarriers signifies indexes of the subcarriers. That is, when it is assumed that the number of the whole subcarriers used in the multi serving BS structure-OFDMA communication system is N, each of the N subcarriers is endowed with any one of indexes 1 to N, and the indexes are assigned according to frequency bands of the subcarriers such that indexes 1 to N are sequentially assigned from a subcarrier having the lowest frequency band to a subcarrier having the highest frequency band. Thus, the fact that the assigned subcarriers have fixed indexes represents that the frequency bands of the assigned subcarriers are also fixed.

If the same number of subcarriers are assigned to each of the H BSs, a relation can be established as expressed below in Equation 1:

$$b_1 = b_2 = \ldots = b_H = \frac{N}{H} \tag{1}$$

In Equation 1, it is assumed that the multi serving BS structure-OFDMA communication system controls the subcarriers satisfying $$\sum_{h=1}^{H} b_h = N$$

in consideration of resource efficiency.

In addition, each of the first MS-subcarrier-assignment-information/BS-selection-information generator 213-1 to the H-th MS-subcarrier-assignment-information/BS-selection-information generator 213-H receives the BS-subcarrier-assignment-information transmitted from each of the first BS-subcarrier-assignment-information generator 211-1 to the H-th BS-subcarrier-assignment-information generator 211-H and selects MSs to which the respective subcarriers assigned to the corresponding BS will be assigned.

The first MS-subcarrier-assignment-information/BS-selection-information generator 213-1 to the H-th MS-subcarrier-assignment-information/BS-selection-information generator 213-H are different from each other only in the number and positions of subcarriers assigned to the respective BSs, and the MSs to which the subcarriers assigned to the respective BSs will be assigned, so their operations are substantially the same. Therefore, in the following description, the operation of each of the first MS-subcarrier-assignment-information/BS-selection-information generator 213-1 to the H-th MS-subcarrier-assignment-information/BS-selection-information generator 213-H will be described by exemplifying the operation of the first MS-subcarrier-assignment-information/BS-selection-information generator 213-1.

The first MS-subcarrier-assignment-information/BS-selection-information generator 213-1 assigns $b_1$ number of subcarriers, which are assigned to the first BS 120-1, to MSs to which the first BS 120-1 provides services in the capacity of a serving BS. In the simplest scheme, the first MS-subcarrier-assignment-information/BS-selection-information generator 213-1 assigns a first one of the $b_1$ subcarriers to the first MS 110-1, assigns a second one of the $b_1$ subcarriers to the second MS 110-2, and so forth. In this way, all the subcarriers up to the last subcarrier, that is, the $b_H$-th subcarrier are assigned to the corresponding MSs. Here, since the first MS-subcarrier-assignment-information/BS-selection-information generator 213-1 also performs scheduling by using the SA/SR scheme, indexes of the subcarriers assigned to the MSs are set as fixed.

Each of the first MS-subcarrier-assignment-information/BS-selection-information generator 213-1 to the H-th MS-subcarrier-assignment-information/BS-selection-information generator 213-H generates the MS-subcarrier-assignment-information and the BS-selection-information to transmit them to the selector 317. Here, the BS-selection-information refers to information about a BS which manages subcarriers assigned to a specific MS. For example, when the subcarriers assigned to a specific MS are sub-carriers managed by the first BS 120-1, the BS-selection-information becomes the first BS 120-1.

Consequently, the SA/SR scheduler 131 enables BSs to transmit subcarrier signals to MSs and receive sub-carrier signals from the MSs while minimizing complexity in the transmission/reception of the subcarrier signals by fixedly setting the number and positions of subcarriers to be assigned BS by BS and then fixedly assigning the subcarriers, which have been assigned BS by BS, to corresponding MSs. However, in a case of using the SA/SR scheme, it is difficult to acquire site diversity because CQI are not considered at all.

Figure 3:
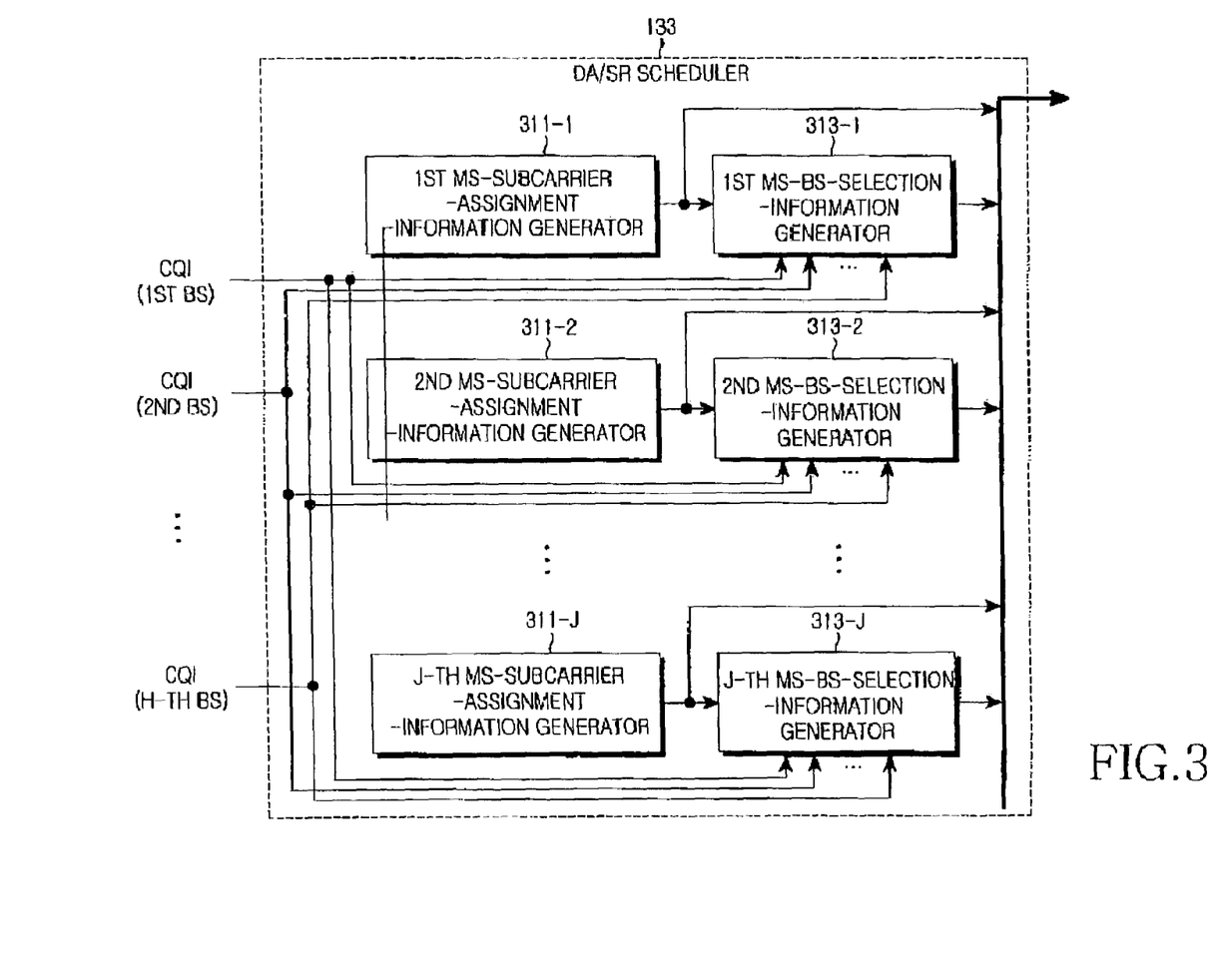
FIG. 3 is a schematic view showing an internal structure of a dynamic assignment/static reception scheduler 133 in FIG. 1.

An internal structure of the DA/SR scheduler 133 will be described next with reference to FIG. 3. Prior to the description of FIG. 3, it is noted that the DA/SR scheme is a scheduling scheme for minimizing the complexities of receivers, that is, MSs while maximizing system capacity. Referring to FIG. 3, the DA/SR scheduler 133 includes J number of MS-subcarrier-assigmnent-information generators consisting of a first MS-subcarrier-assignment-information generator 311-1 to a J-th MS-subcarrier-assignment-information generator 311-J, and J number of BS-selection-information generators consisting of a first MS-BS-selection-information generator 313-1 to a J-th MS-BS-selection-information generator 313-J, which are connected to the first MS-subcarrier-assignment-information generator 311-1 to the J-th MS-subcarrier-assignment-information generator 311-J, respectively.

Each of the first MS-subcarrier-assignment-information generator 311-1 to the J-th MS-subcarrier-assignment-information generator 311-J generates assignment information about subcarriers assigned to itself, that is, MS-subcarrier-assignment-information to transmit it to a corresponding MS-BS-selection-information generator and the selector 137, respectively. Here, since each of the first MS-subcarrier-assignment-information generator 311-1 to the J-th MS-subcarrier-assignment-information generator 311-J performs scheduling by using the DA/SR scheme, the number and positions of subcarriers assigned to the respective MSs are fixed. That is, when the DA/SR scheme is used, the respective MSs can fixedly receive subcarriers because the number and positions of subcarriers assigned thereto are fixed, so the complexities of the MSs can be minimized. However, in the case of using the DA/SR scheme, BSs, which manage the subcarriers having the fixed number and positions to be assigned to the respective MSs, are dynamically assigned such that site diversity is acquired.

The first MS-subcarrier-assignment-information generator 311-1 generates subcarrier-assignment-information for $m_1$ subcarriers, the second MS-subcarrier-assignment-information generator 311-2 generates subcarrier-assignment-information for $m_2$ subcarriers, and so forth. In this way, the last MS-subcarrier-assignment-information generator, that is, the J-th MS-subcarrier-assignment-information generator 311-J generates subcarrier-assignment-information for $m_J$ subcarriers.

Here, it is assumed that the number of subcarriers to be assigned to the respective MSs has a relation as expressed below in Equation 2:

$$\sum_{j=1}^{J} M_j = N \quad (2)$$

In Equation 2, if a relation of $$m_j = \frac{N}{J}$$

is assumed for all j, a first subcarrier to a $$\left(\frac{N}{J}\right)-th$$

subcarrier are assigned to the first MS 110-1, a $$\left(\frac{N}{J}+1\right)-th$$

subcarrier to a $$\left(\frac{2N}{J}\right)-th$$

subcarrier are assigned to the second MS 110-2, and so forth. In this way, a $$\left(\frac{(J-1)N}{J}\right)-th$$

subcarrier to a N-th subcarrier are assigned to the last MS, that is, the J-th MS 110-J. If the data amounts to be provided to the respective MSs are different from each other, then the $m_j$ may be adjusted correspondingly to the data amounts. Of course, the positions of subcarriers to be assigned to the respective MSs may be adjusted according to the extent of a frequency selective fading phenomenon. However, the $m_j$ and the positions of subcarriers must be fixedly maintained after their adjustments.

In addition, each of the first MS-BS-selection-information generator 313-1 to the J-th MS-BS-selection-information generator 313-J receives subcarrier-assignment-information transmitted from each of the first MS-subcarrier-assignment-information generator 311-1 to the J-th MS-subcarrier-assignment-information generator 311-J and CQI fed-back from each of the first MS 110-1 to the J-th MS 110-J. Each of the first MS-BS-selection-information generator 313-1 to the J-th MS-BS-selection-information generator 313-J also selects BSs, which manage the respective subcarriers, according to the received information and then transmits BS-selection-information for the selected BSs to the selector 137.

Therefore, each of the first MS-subcarrier-assignment-information generator 311-1 to the J-th MS-subcarrier-assignment-information generator 311-J transmits the subcarrier-assignment-information to the selector 317, and each of the first MS-BS-selection-information generator 313-1 to the J-th MS-BS-selection-information generator 313-J transmits the BS-selection-information to the selector 137. Here, in order to maximize system capacity, BSs where the respective subcarriers have the best channel gain are selected when the BSs managing the respective subcarriers are selected. That is, with an increase in the number of serving BSs for an arbitrary MS, the channel gain of the subcarriers assigned to the MS has the higher probability of being excellent. Diversity in which an increase in the number of serving BSs results in an increase in the channel gain is the site diversity.

Figure 4:
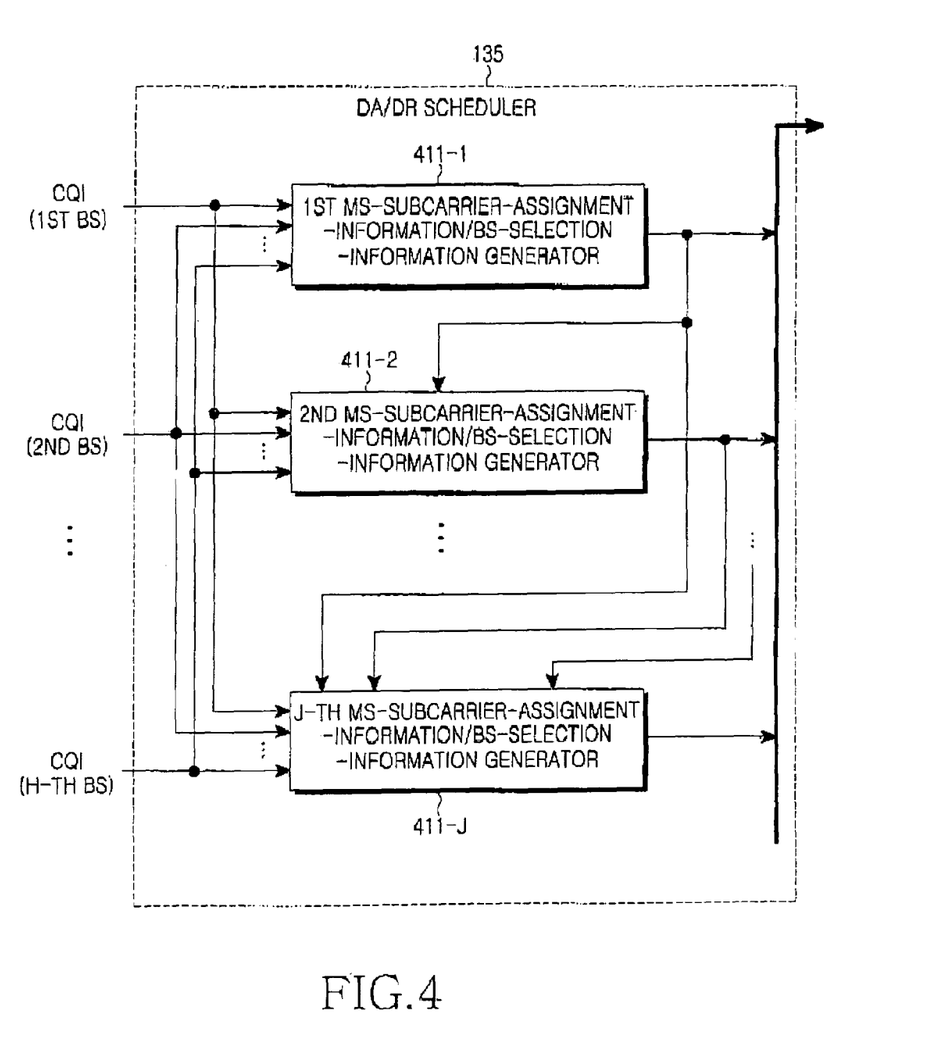
FIG. 4 is a schematic view showing an internal structure of a dynamic assignment/dynamic reception scheduler 135 in FIG. 1.

An internal structure of the DA/DR scheduler 135 will be described next with reference to FIG. 4. Referring to FIG. 4, the DA/DR scheduler 135 includes J number of MS-subcarrier-assignment-information/BS-selection-information generators consisting of a first MS-subcarrier-assignment-information/BS-selection-information generator 411-1 to a J-th MS-subcarrier-assignment-information/BS-selection-information generator 411-J.

Each of the first MS-subcarrier-assignment-information/BS-selection-information generator 411-1 to the J-th MS-subcarrier-assignment-information/BS-selection-information generator 411-J receives CQI fed-back from each of the first MS 110-1 to the J-th MS 110-J. Correspondingly to the received CQI, each of the first MS-subcarrier-assignment-information/BS-selection-information generator 411-1 to the J-th MS-subcarrier-assignment-information/BS-selection-information generator 411-J generates subcarrier-assignment-information for subcarriers assigned to each of the first MS 110-1 to the J-th MS 110-J and selects BSs, which manage the subcarriers assigned to each of the first MS 110-1 to the J-th MS 110-J, to generate BS-selection-information for the selected BSs, and then transmits the subcarrier-assignment-information and the BS-selection information to the selector 137.

Here, since each of the first MS-subcarrier-assignment-information/BS-selection-information generator 411-1 to the J-th MS-subcarrier-assignment-information/BS-selection-information generator 411-J performs scheduling by using the DA/DR scheme, it dynamically assigns the number and positions of the subcarriers assigned to the respective MSs and the BSs managing the subcarriers assigned to the respective MSs such that the site diversity is acquired.

The first MS-subcarrier-assignment-information/BS-selection-information generator 411-1 generates subcarrier-assignment-information for dynamically assigned $m_1$ subcarriers, and selects BSs managing the respective $m_1$ subcarriers to generate BS-selection-information, and then transmits the subcarrier-assignment-information and the BS-selection-information to the selector 137. Here, the first MS-subcarrier-assignment-information/BS-selection-information generator 411-1 dynamically assigns the $m_1$ subcarriers, the positions of which are variable. Also, in order to maximize system capacity when selecting the BSs which possess the respective subcarriers, the first MS-subcarrier-assignment-information/BS-selection-information generator 411-1 selects BSs, where the respective subcarriers have the best channel gain, so as to acquire the site diversity. As a result of this, the first MS-subcarrier-assignment-information/BS-selection-information generator 411-1 assigns the $m_1$ subcarriers, which have the most channel gain from among the whole of subcarriers used in the multi serving structure-OFDMA communication system when assigned to the first MS 110-1, to the first MS 110-1, and selects the BSs managing the subcarriers assigned to the first MS 110-1.

In addition, the second MS-subcarrier-assignment-information/BS-selection-information generator 411-2 generates subcarrier-assignment-information for dynamically assigned $m_2$ subcarriers, and selects BSs managing the respective $m_2$ subcarriers to generate BS-selection-information, and then transmits the subcarrier-assignment-information and the BS-selection-information to the selector 137. Here, the second MS-subcarrier-assignment-information/BS-selection-information generator 411-2 dynamically assigns the $m_2$ subcarriers, the positions of which are variable. Also, in order to maximize system capacity when selecting the BSs which occupy the respective subcarriers, the second MS-subcarrier-assignment-information/BS-selection-information generator 411-2 selects BSs, where the respective subcarriers have the best channel gain, so as to acquire the site diversity. As a result of this, the second MS-subcarrier-assignment-information/BS-selection-information generator 411-2 assigns the $m_2$ subcarriers, which have the most channel gain from among the whole of subcarriers used in the multi serving structure-OFDMS communication system, excluding the $m_1$ subcarriers assigned to the first MS 110-1, when assigned to the second MS 110-2, to the second MS 110-2, and selects the BSs possessing the subcarriers assigned to the second MS 110-2.

In this way, the J-th MS-subcarrier-assignment-information/BS-selection-information generator 411-J generates subcarrier-assignment-information for dynamically assigned $m_J$ subcarriers, and selects BSs managing the respective $m_J$ subcarriers to generate BS-selection-information, and then transmits the subcarrier-assignment-information and the BS-selection-information to the selector 137. Here, the J-th MS-subcarrier-assignment-information/BS-selection-information generator 411-J dynamically assigns the $m_J$ subcarriers, the positions of which are variable. Also, in order to maximize system capacity when selecting the BSs which occupy the respective subcarriers, the J-th MS-subcarrier-assignment-information/BS-selection-information generator 411-J selects BSs, where the respective subcarriers have the best channel gain, so as to acquire the site diversity. As a result of this, the J-th MS-subcarrier-assignment-information/BS-selection-information generator 411-J assigns the $m_J$ subcarriers, which have the most channel gain from among the whole subcarriers used in the multi serving structure-OFDMA communication system, excluding all the subcarriers assigned to the first MS 110-1 to the (J−1)-th MS 110-(J−1), when assigned to the J-th MS 110-J, to the J-th MS 110-J, and selects the BSs possessing the subcarriers assigned to the J-th MS 110-J.

Figure 5:
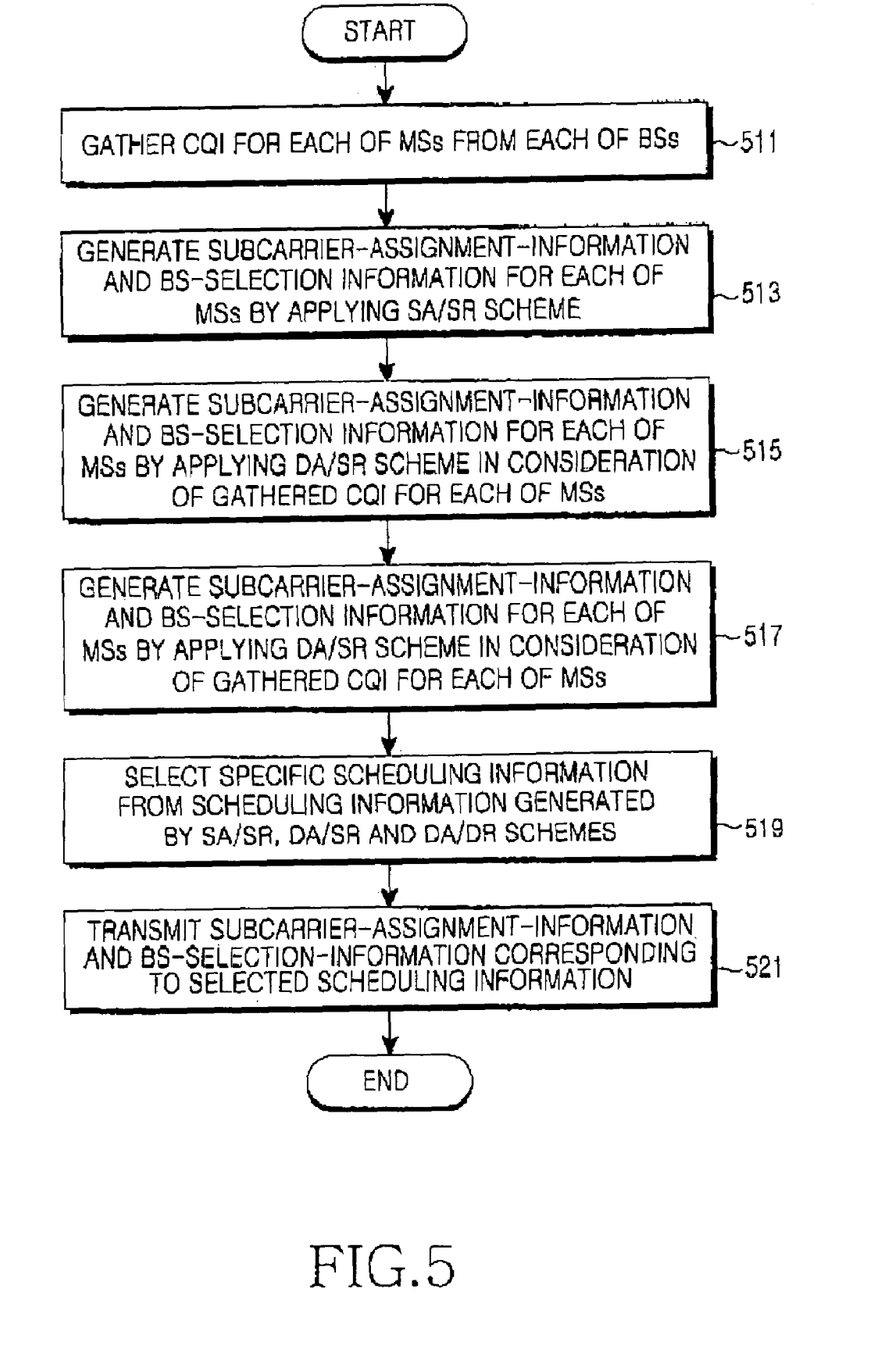
FIG. 5 is a flowchart showing operation procedures of the subcarrier assignment apparatus in FIG. 1.

Operation procedures of the subcarrier assignment apparatus 130 in FIG. 1 will be described next with reference to FIG. 5. Referring to FIG. 5, in step 511, the subcarrier assignment apparatus 130 gathers CQI for each of J MSs (i.e., a first MS 110-1 to a J-th MS 110-J), which are fed-back from each of H BSs constituting the multi serving BS structure-OFDMA communication system (i.e., a first BS 120-1 to a H-th BS 120-H), and then proceeds to step 513. In step 513, the subcarrier assignment apparatus 130 generates subcarrier-assignment-information and BS-selection-information for each of the first MS 110-1 to the J-th MS 110-J by applying an SA/SR scheme, and then proceeds to step 515. Here, when generating the subcarrier-assignment-information and the BS-selection-information for each of the first MS 110-1 to the J-th MS 110-J by applying the SA/SR scheme, the subcarrier assignment apparatus 130 takes into consideration the CQI for each of the first MS 110-1 to the J-th MS 110-J. Also, since the operation of generating the subcarrier-assignment-information and the BS-selection-information for each of the first MS 110-1 to the J-th MS 110-J by applying the SA/SR scheme has been described in conjunction with FIG. 2, a detailed description thereof is omitted here.

In step 515, the subcarrier assignment apparatus 130 generates subcarrier-assignment-information and BS-selection information for each of the first MS 110-1 to the J-th MS 110-J by applying a DA/SR scheme, and then proceeds to step 517. Here, since the operation of generating the subcarrier-assignment-information and the BS-selection-information for each of the first MS 110-1 to the J-th MS 110-J by applying the DA/SR scheme has been also described in conjunction with FIG. 3, a detailed description thereof is omitted here.

In step 517, the subcarrier assignment apparatus 130 generates subcarrier-assignment-information and BS-selection information for each of the first MS 110-1 to the J-th MS 110-J by applying a DA/DR scheme in consideration of the gathered CQI for each of the first MS 110-1 to the J-th MS 110-J, and then proceeds to step 519. Here, since the operation of generating the subcarrier-assignment-information and the BS-selection-information for each of the first MS 110-1 to the J-th MS 110-J by applying the DA/DR scheme has been also described in conjunction with FIG. 4, a detailed description thereof is omitted here.

In step 519, the subcarrier assignment apparatus 130 selects subcarrier-assignment-information and BS-selection information corresponding to a predetermined scheduling scheme for the multi-serving BS structure-OFDMA communication system, from among scheduling information generated by the SA/SR scheduler 131, the DA/SR scheduler 133 and the DA/DR scheduler 135, that is, the subcarrier-assignment-information and the BS-selection information for each of the first MS 110-1 to the J-th MS 110-J, and then proceeds to step 521. In step 521, the subcarrier assignment apparatus 130 transmits the subcarrier-assignment-information and the BS-selection information for each of the first MS 110-1 to the J-th MS 110-J, which correspond to the selected scheduling information, to each of the first BS 120-1 to the H-th BS 120-H, and thus controls each of the first BS 120-1 to the H-th BS 120-H such that it assigns subcarriers to each of the first MS 110-1 to the J-th MS 110-J.

Figure 6:
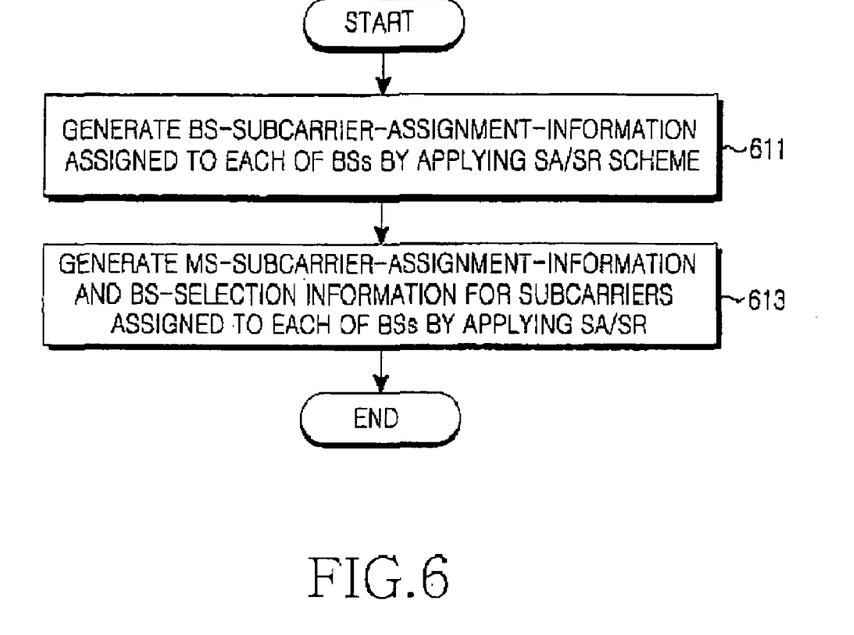
FIG. 6 is a flowchart showing operation procedures of the static assignment/static reception scheduler 131 in FIG. 1.

Operation procedures of the SA/SR scheduler 131 will be described next with reference to FIG. 6. Referring to FIG. 6, in step 611, the SA/SR scheduler 131 generates BS-subcarrier-assignment-information assigned to each of the first BS 120-1 to the H-th BS 120-H by applying the SA/SR scheme, and then proceeds to step 613.

In step 613, the SA/SR scheduler 131 generates subcarrier-assignment-information and BS-selection information for each of J MSs (i.e., a first MS 110-1 to a J-th MS 110-J) regardless of CQI for each of the first MS 110-1 to the J-th MS 110-J, which are fed-back from each of H BSs constituting the multi serving BS structure-OFDMA communication system (i.e., a first BS 120-1 to a H-th BS 120-H), and then ends its operation. Here, since the operation of generating the subcarrier-assignment-information and the BS-selection-information for each of the first MS 110-1 to the J-th MS 110-J by applying the SA/SR scheme has been described in conjunction with FIG. 2, a detailed description thereof is omitted here.

Figure 7:
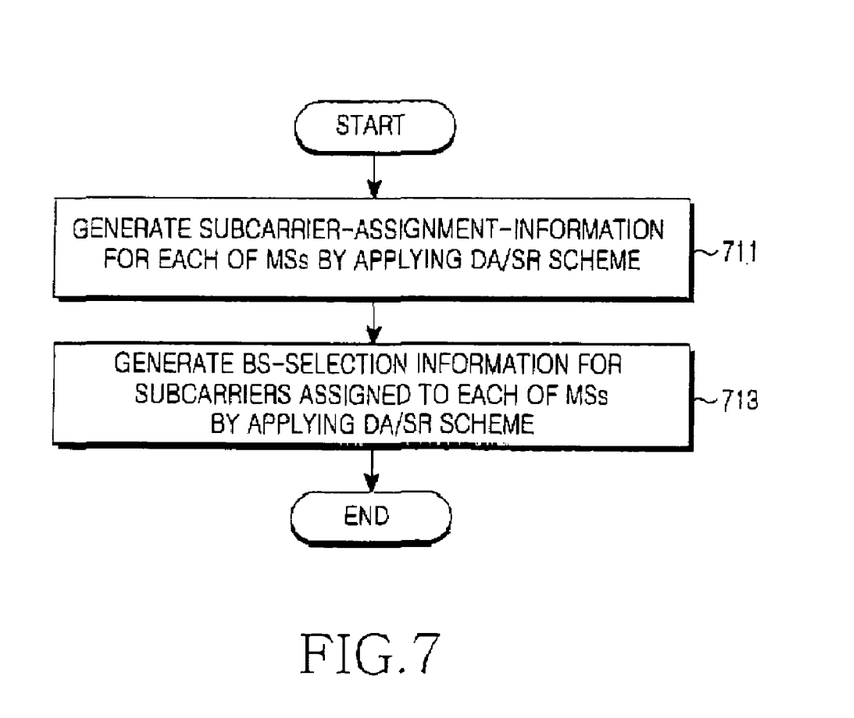
FIG. 7 is a flowchart showing operation procedures of the dynamic assignment/static reception scheduler 133 in FIG. 1.

Operation procedures of the DA/SR scheduler 133 will be described next with reference to FIG. 7. Referring to FIG. 7, in step 711, the DA/SR scheduler 133 generates subcarrier-assignment-information for each of a first MS 110-1 to a J-th MS 110-J by applying the DA/SR scheme, and then proceeds to step 713. Here, the DA/SR scheduler 133 generates the subcarrier-assignment-information for each of the first MS 110-1 to the J-th MS 110-J in consideration of CQI for each of the first MS 110-1 to the J-th MS 110-J, which are fed-back from each of H BSs constituting the multi serving BS structure-OFDMA communication system (i.e., a first BS 120-1 to a H-th BS 120-H).

In step 713, the DA/SR scheduler 133 generates BS-selection-information for BSs possessing the subcarriers assigned to each of the first MS 110-1 to the J-th MS 110-J by applying the DA/SR scheme, and then ends its operation. Here, the DA/SR scheduler 133 generates the BS-selection-information for the BSs possessing the subcarriers assigned to each of the first MS 110-1 to the J-th MS 110-J in consideration of the CQI for each of the first MS 110-1 to the J-th MS 110-J, which are fed-back from each of the first BS 120-1 to the H-th BS 120-H. Since the operation of generating the subcarrier-assignment-information and the BS-selection-information for each of the first MS 110-1 to the J-th MS 110-J by applying the DA/SR scheme has been described in conjunction with FIG. 3, a detailed description thereof is omitted here.

Figure 8:
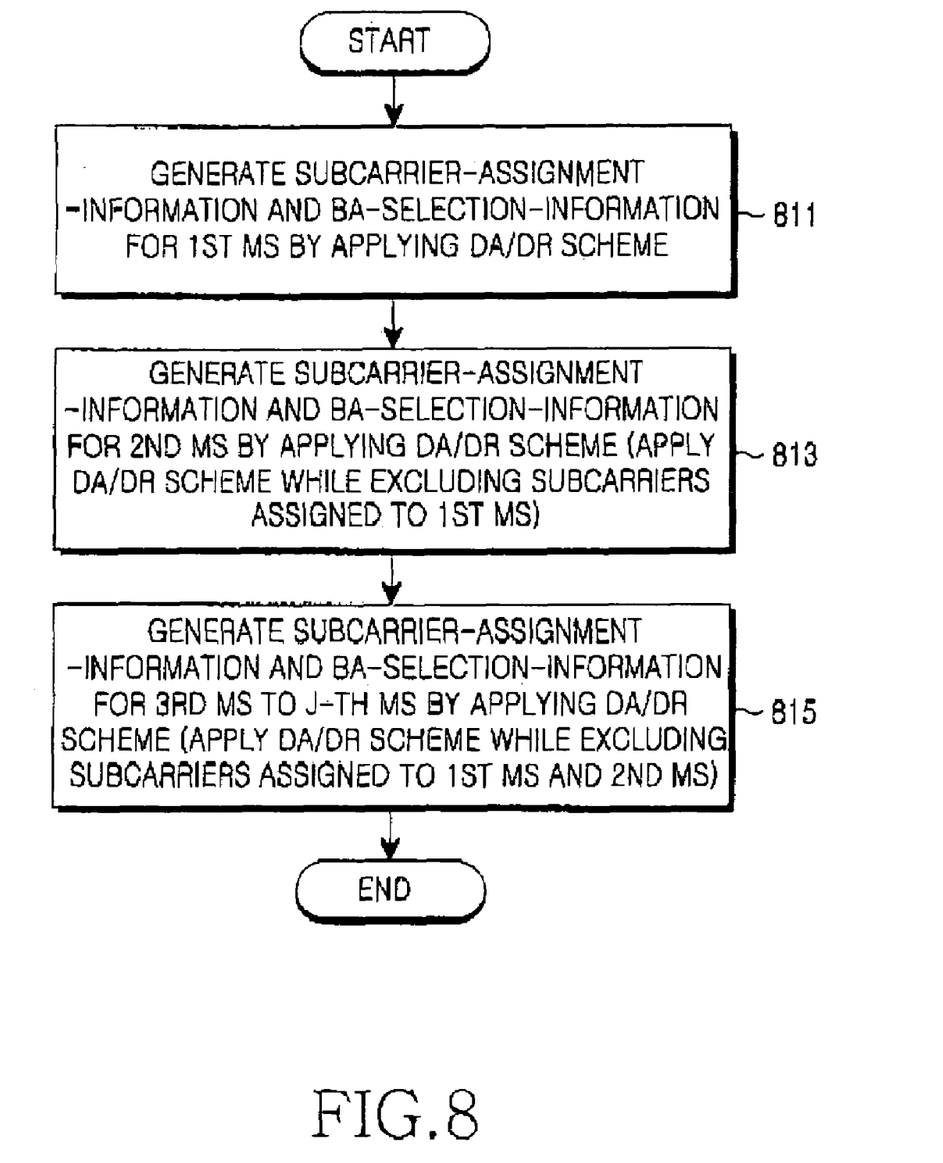
FIG. 8 is a flowchart showing operation procedures of the dynamic assignment/dynamic reception scheduler 135 in FIG. 1.

Operation procedures of the DA/DR scheduler 135 will be described next with reference to FIG. 8. Referring to FIG. 8, in step 811, the DA/DR scheduler 135 generates scheduling information, that is, subcarrier-assignment-information and BS-selection-information for a first MS 110-1 by applying the DA/DR scheme, and then proceeds to step 813. Here, the DA/DR scheduler 135 generates the subcarrier-assignmentinformation and the BS-selection-information for the first MS 110-1 in consideration of CQI for each of the first MS 110-1 to the J-th MS 110-J, which are fed-back from each of H BSs constituting the multi serving BS structure-OFDMA communication system (i.e., a first BS 120-1 to a H-th BS 120-H).

In step 813, the DA/DR scheduler 135 generates scheduling information, that is, subcarrier-assignment-information and BS-selection-information for a second MS 110-2 by applying the DA/DR scheme, and then proceeds to step 815. Here, the DA/DR scheduler 135 generates the subcarrier-assignment-information and the BS-selection-information for the second MS 110-2 in consideration of the CQI for each of the first MS 110-1 to the J-th MS 110-J, which are fed-back from each of the first BS 120-1 to the H-th BS 120-H. Also, as stated above, the DA/DR scheduler 135 assigns subcarriers, which have the most channel gain from among the whole subcarriers used in the multi serving structure-OFDMA communication system, excluding the subcarriers assigned to the first MS 110-1, when assigned to the second MS 110-2, to the second MS 110-2.

In this way, the DA/DR scheduler 135 generates scheduling information, that is, subcarrier-assignment-information and BS-selection-information for the remaining MSs (i.e., a third MS 110-3 to a J-th MS 110-J) by applying the DA/DR scheme, and then ends its operation. Here, in the same manner as that for the second MS 110-2, the DA/DR scheduler 135 generates the subcarrier-assignment-information and the BS-selection-information for the remaining MSs in consideration of the CQI for each of the first MS 110-1 to the J-th MS 110-J, which are fed-back from each of the first BS 120-1 to the H-th BS 120-H. Since the operation of generating the subcarrier-assignment-information and the BS-selection-information for each of the first MS 110-1 to the J-th MS 110-J by applying the DA/DR scheme has been described in conjunction with FIG. 4, a detailed description thereof is omitted here.

Figure 9:
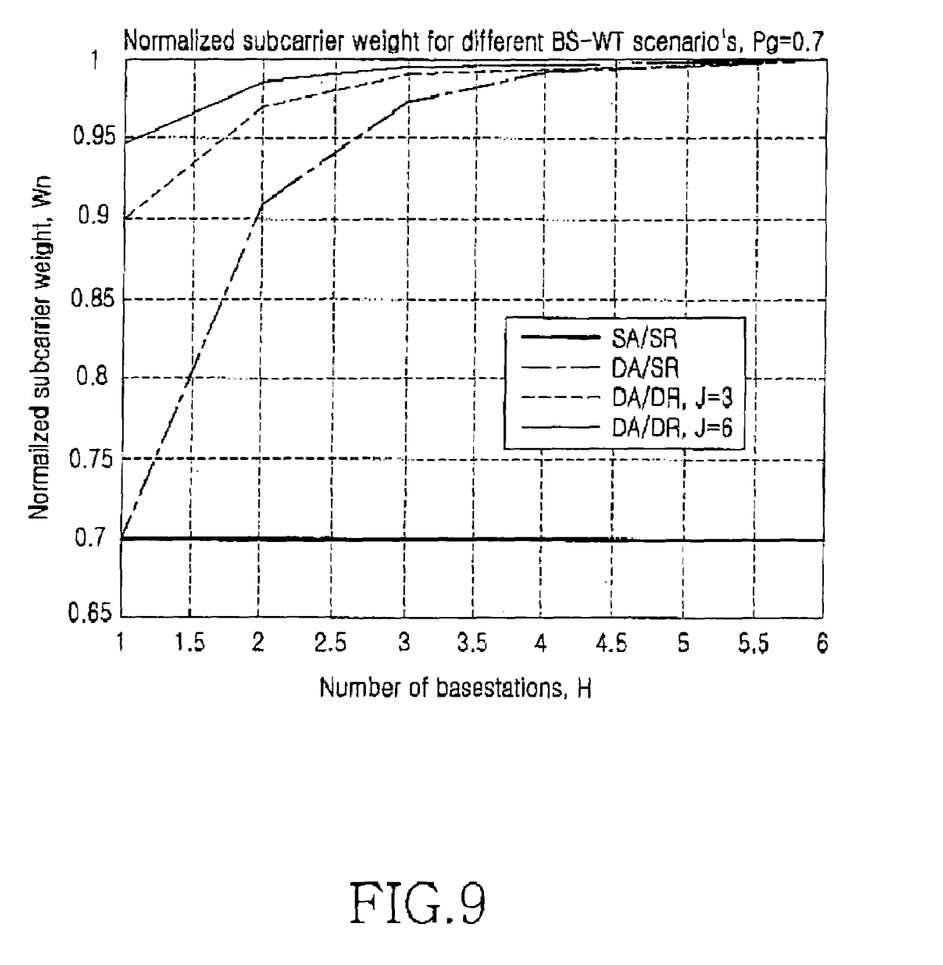
FIG. 9 is a graph showing system performances when a static assignment/static reception scheme, a dynamic assignment/static reception scheme and a dynamic assignment/dynamic reception scheme are applied to an OFDMA communication system having a multi serving BS structure as proposed in the present invention.

A description will be given next for system performances when the SA/SR scheme, the DA/SR scheme and the DA/DR scheme are applied to the multi serving BS structure-OFDMA communication system as proposed in the present invention with reference to FIG. 9. FIG. 9 is a graph showing system performances when the SA/SR scheme, the DA/SR scheme and the DA/DR scheme are applied to the multi serving BS structure-OFDMA communication system as proposed in the present invention. FIG. 9 also shows system performances in a case where the DA/DR scheme is applied to three MSs (J=3) and in a case where the DA/DR scheme is applied to six MSs (J=6).

Referring to FIG. 9, the abscissa axis denotes the number of serving BSs, that is, the number of H BSs, and the ordinate axis denotes a normalized subcarrier weight (Wn). Here, the larger the normalized subcarrier weight is, the larger is the system capacity. As illustrated in FIG. 9, in a case of applying the SA/SR scheme, the system capacity does not increase, but is maintained constant when the number of serving BSs increases. Of course, although not shown separately in FIG. 9, the system capacity increases as compared with an ordinary OFDMA communication system even when the SA/SR scheme is applied because the number of serving BSs increases in comparison with the ordinary OFDMA communication system.

However, in cases of applying the DA/SR scheme and the DA/DR scheme, it can be seen that the system capacity increases as the number of serving BSs increases. As a result, it can be seen that site diversity gain increases with an increase in the number of serving BSs when applying the DA/SR scheme and the DA/DR scheme. Also, even when the DA/DR scheme is applied in the same way, the site diversity gain increases as the number of MSs to which the DA/DR scheme is applied increases.

As described above, the present invention acquires the site diversity gain by applying the SA/SR scheme, the DA/SR scheme and the DA/DR scheme to assigning subcarriers for MSs in the multi serving BS structure-OFDMA communication system, thereby maximizing the system capacity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for assigning subcarrier in an orthogonal frequency division multiple access communication system, the method comprising the steps of:

receiving from the respective base stations feedback of channel quality information for each of mobile stations, to which each of a plurality of base stations constituting the orthogonal frequency division multiple access communication system provides services in the capacity of a serving base station;

assigning subcarriers to the respective mobile stations according to a corresponding scheduling scheme in consideration of the channel quality information for the respective mobile stations; and selecting base stations which manage the subcarriers assigned to the respective mobile stations according to the corresponding scheduling scheme.

2. The method as claimed in claim 1, further comprising transmitting to the base stations subcarrier-assignment-information for the subcarriers assigned to the respective mobile stations and base station-selection-information for the base stations, which manage the subcarriers assigned to the respective mobile stations.

3. The method as claimed in claim 1, wherein the step of assigning the subcarriers to the respective mobile stations according to the corresponding predetermined scheduling scheme in consideration of the channel quality information for the respective mobile stations, and the step of selecting the base stations which manage the subcarriers assigned to the respective mobile stations comprises:

assigning to the respective mobile stations the predetermined number of subcarriers, each of which has a predetermined subcarrier frequency band; and selecting serving base stations which manage the subcarriers assigned to the respective mobile stations in consideration of the channel quality information for the respective mobile stations.

4. The method as claimed in claim 3, wherein the step of selecting the serving base stations which manage the subcarriers assigned to the respective mobile stations in consideration of the channel quality information for the respective mobile stations selects serving base stations where a channel gain is the best when a signal is transmitted through the assigned subcarriers to the respective mobile stations.

5. The method as claimed in claim 1, wherein the step of assigning the subcarriers to the respective mobile stations according to the corresponding scheduling scheme in consideration of the channel quality information for the respective mobile stations, and the step of selecting the base stations which manage the subcarriers assigned to the respective mobile stations comprises:

assigning the predetermined number of subcarriers to the respective mobile stations in consideration of the channel quality information for the respective mobile stations; and selecting serving base stations which manage the subcarriers assigned to the respective mobile stations in consideration of the channel quality information for the respective mobile stations.

6. The method as claimed in claim 5, wherein the step of assigning the predetermined number of the subcarriers to the respective mobile stations in consideration of the channel quality information for the respective mobile stations assigns to the mobile stations subcarriers, which has the best channel gain when assigned to the respective mobile stations.

7. The method as claimed in claim 5, wherein the step of selecting the serving base stations which manage the subcarriers assigned to the respective mobile stations in consideration of the channel quality information for the respective mobile stations selects serving base stations where a channel gain is the best when a signal is transmitted through the assigned subcarriers to the respective mobile stations.

8. The method as claimed in claim 1, further comprising:
   assigning subcarriers to the respective mobile stations according to the corresponding scheduling scheme without considering the channel quality information for the respective mobile stations; and
   selecting base stations which manage the subcarriers assigned to the respective mobile stations according to the corresponding scheduling scheme.

9. The method as claimed in claim 8, wherein the step of assigning the subcarriers to the respective mobile stations according to the corresponding predetermined scheduling scheme without considering the channel quality information for the respective mobile stations, and the step of selecting the base stations which manage the subcarriers assigned to the respective mobile stations comprises:
   assigning to the respective mobile stations the predetermined number of subcarriers, each of which has a predetermined subcarrier frequency band; and
   selecting serving base stations which manage the subcarriers assigned to the respective mobile stations.

10. A apparatus for assigning subcarrier in an orthogonal frequency division multiple access communication system, comprising schedulers for assigning subcarriers to each of mobile stations, to which each of a plurality of base stations constituting the orthogonal frequency division multiple access communication system provides services in the capacity of a serving base station, according to a corresponding scheduling scheme in consideration of channel quality information for the respective mobile stations, which are fed-back from the respective base stations, and selecting base stations which manage the subcarriers assigned to the respective mobile stations according to the corresponding scheduling scheme.

11. The apparatus as claimed in claim 10, further comprising a transmitter for transmitting to the base stations subcarrier assignment information for the subcarriers assigned to the respective mobile stations and base station selection information for the base stations, which manage the subcarriers assigned to the respective mobile stations.

12. The apparatus as claimed in claim 10, wherein the schedulers assign to the respective mobile stations a predetermined number of subcarriers, each of which has a predetermined subcarrier frequency band, and select serving base stations which manage the subcarriers assigned to the respective mobile stations in consideration of the channel quality information for the respective mobile stations.

13. The apparatus as claimed in claim 12, wherein the schedulers select serving base stations where a channel gain is the best when a signal is transmitted to the respective mobile stations through the assigned subcarriers.

14. The apparatus as claimed in claim 10, wherein the schedulers assign the predetermined number of subcarriers to the respective mobile stations in consideration of the channel quality information for the respective mobile stations, and select serving base stations which manage the subcarriers assigned to the respective mobile stations in consideration of the channel quality information for the respective mobile stations.

15. The apparatus as claimed in claim 14, wherein the schedulers assign to the mobile stations subcarriers, which has the best channel gain when assigned to the respective mobile stations.

16. The apparatus as claimed in claim 14, wherein the schedulers select serving base stations where a channel gain is the best when a signal is transmitted to the respective mobile stations through the assigned subcarriers.

17. The apparatus as claimed in claim 10, wherein the subcarrier assignment apparatus assigns subcarriers to the respective mobile stations according to the corresponding scheduling scheme without considering the channel quality information for the respective mobile stations, and selects base stations which manage the subcarriers assigned to the respective mobile stations according to the corresponding scheduling scheme.

18. The apparatus as claimed in claim 17, wherein the schedulers assign to the respective mobile stations the subcarriers, each of which has a subcarrier frequency band, to the respective mobile stations, and select serving base stations which manage the subcarriers assigned.

* * * * *